US006555247B2

(12) United States Patent
Yamaguchi

(10) Patent No.: US 6,555,247 B2
(45) Date of Patent: Apr. 29, 2003

(54) ALUMINUM ALLOY PLATE FOR PLANOGRAPHIC PRINTING PLATE

(75) Inventor: Keitarou Yamaguchi, Shizuoka (JP)

(73) Assignee: Mitsubishi Aluminum Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/901,313

(22) Filed: Jul. 9, 2001

(65) Prior Publication Data

US 2002/0025448 A1 Feb. 28, 2002

(30) Foreign Application Priority Data

Jul. 11, 2000 (JP) ....................................... 2000-209882
Jun. 13, 2001 (JP) ....................................... 2001-178204

(51) Int. Cl.$^{7}$ ............................ B32B 5/14; C22C 21/12

(52) U.S. Cl. ....................... 428/610; 101/395; 101/459; 148/438; 148/439; 148/440; 148/902; 205/69; 428/654; 428/687; 428/926

(58) Field of Search ................................. 428/610, 654, 428/687, 926; 148/438, 439, 440, 902; 101/459, 395; 205/69

(56) References Cited

U.S. PATENT DOCUMENTS 5,779,824 A * 7/1998 Sawada et al. ............. 148/438

FOREIGN PATENT DOCUMENTS

JP 2000-282158 10/2000

* cited by examiner

*Primary Examiner*—Robert R. Koehler
(74) *Attorney, Agent, or Firm*—Anderson Kill & Olick; Eugene Lieberstein; Michael N. Meller

(57) ABSTRACT

An aluminum alloy plate for a planographic printing plate capable of being provided with a satisfactory roughed surface by electrolytic etching. The aluminum alloy plate contains 0.1 to 0.6% of Fe, 0.01 to 0.2% of Si, 5 to 150 ppm of Cu, and balance of Al and unavoidable impurities and has a surface layer portion formed of a metastable phase dispersion layer in which metastable phase AlFe-based intermetallic compound particles are dispersed. The metastable intermetallic compound particles each act as a starting point for pits. The alloy plate is formed with a roughed surface which is reduced in unetching and uniformly formed with pits, by electrolytic etching.

32 Claims, No Drawings

ALUMINUM ALLOY PLATE FOR PLANOGRAPHIC PRINTING PLATE

BACKGROUND OF THE INVENTION

This invention relates to an aluminum alloy plate for A planographic printing plate which includes a lithographic printing plate, and more particularly to an aluminum alloy plate for a planographic printing plate which is used for a PS(presensitized) printing plate having a photosensitive layer previously formed thereon and subjected to either a developing treatment or both the developing treatment and a printing treatment of the photosensitive layer.

In planography, a PS printing plate which has a photosensitive layer previously formed thereon and is subjected to either a developing treatment or both developing and printing treatments has been widely used. The PS printing plate has a rough surface on which a photosensitive agent is coated. The PS printing plate is generally made of JIS 1050-type aluminum alloy increased in electrolytic etching properties.

The PS printing plate is manufactured by subjecting the aluminum alloy to predetermined steps, during which the printing plate is subjected to a surface treatment prior to coating of the above-described photosensitive agent thereon. The surface treatment is carried out by subjecting the printing plate to a surface roughing treatment by electrolytic etching and then forming an oxide film on the thus-roughed surface of the printing plate by anodizing. Also, in the manufacturing, washing by a caustic treatment or the like takes place on the printing plate for degreasing of the plate or the like prior to the surface roughing treatment.

The surface roughing treatment is carried out in order to ensure that the photosensitive agent is securely fixed onto the printing plate during formation of the photosensitive layer while being adhered therewith. Such adhesion significantly affects performance of the printing plate.

Unfortunately, the surface roughing treatment described above which has been conventionally practiced causes unetching to occur on the roughed surface of the plate or causes pits formed by the surface roughing treatment to be non-uniformly distributed on the roughed surface, leading to a deterioration in performance of the printing plate. Thus, it is desired to develop techniques of providing a roughed surface free from such defects as described above.

In the past, improvements have been proposed from a viewpoint of a material for the plate in order to eliminate the above-described disadvantages. One of the improvements is adding specific elements to the material. For example, techniques of adding a predetermined amount of Ni to the material to promote formation of pits, to thereby enhance etching properties of the material are proposed, as disclosed in Japanese Patent Application Laid-Open Publication No. 115333/1999 by way of example. Another proposal of adding Sn, In and Ga to the material to form it with fine pits, leading to an improvement in etching properties of the material is disclosed in Japanese Patent Application Laid-Open Publication No. 210144/1983.

However, such addition of specific elements to the material as proposed fails to satisfactorily solve the above-described problems encountered in the prior art. Also, it causes an increase in manufacturing cost of the printing plate and is an obstacle to recycling of the material.

Techniques of controlling a size of intermetallic compounds in the material and density thereof to improve etching properties of the material without adding any specific element thereto are proposed as well (Japanese Patent Application Laid-Open Publication No. 151870/1999). In the techniques proposed, it is considered that the intermetallic compounds act as a starting point in etching of a printing plate, to thereby permit fine pits to be uniformly formed on the printing plate. However, the techniques likewise fail to satisfactorily improve etching properties of the printing plate, resulting in failing to meet the above-described demand.

As a result of careful study by the inventor, it was found that the reasons why control of a size of the intermetallic compounds and density thereof described above fails to provide the printing plate with satisfactory etching properties are due to the fact that chemical solubility of the intermetallic compounds is increased as compared with expectation, to thereby be readily vanished due to dissolution thereof in an electrolyte, resulting in failing to sufficiently function as a starting point for formation of the etching pits. Also, as a result of a further advance of the study, it was also found that suitable dispersion of particles of an AlFe-based intermetallic compound which has a metastable phase contrary to the above-described compound which has a stable phase in the printing plate permits etching properties thereof to be substantially improved to a degree sufficient to meet the above-described demand.

SUMMARY OF THE INVENTION

The present invention has been made in view of the foregoing disadvantages of the prior art, while taking notice of the above-described facts.

Accordingly, it is an object of the present invention to provide an aluminum alloy plate for a planographic printing plate which is capable of eliminating addition of any special element thereto during a surface roughing treatment.

It is another object of the present invention to provide an aluminum alloy plate for a planographic printing plate which is capable of being provided with a roughed surface reduced in formation of an unetched portion thereon and uniformly formed thereon with pits.

It is a further object of the present invention to provide an aluminum alloy plate for a planographic printing plate which is capable of providing a PS printing plate exhibiting enhanced performance.

The term "percent, ppm" and the like as used herein in connection with a content of ingredients and the like will refer to "percentage, ppm" and the like in a mass ratio unless otherwise specified.

In accordance with the present invention, an aluminum alloy plate for a planographic printing plate is provided. The aluminum alloy plate contains, in a mass ratio, 0.1 to 0.6% of Fe, 0.01 to 0.2% of Si, 5 ppm to 150 ppm of Cu, and balance of Al and unavoidable impurities. Also, the aluminum alloy plate has a surface layer portion formed of a dispersion layer of a metastable phase in which AlFe-based intermetallic compound particles of a metastable phase are dispersed.

In a preferred embodiment of the present invention, the dispersion layer contains, in a plane direction, the metastable phase AlFe-based intermetallic compound particles in a ratio of 5/100 or more to the number of AlFe-based intermetallic compound particles of a stable phase.

In a preferred embodiment of the present invention, the dispersion layer is constructed in a plane direction so that of the intermetallic compound particles, particles (a in number)

satisfying the following expression A and those (b in number) satisfying the following expression B have relationship therebetween which satisfies the following expression C:

Al quantity/Fe quantity≦1.6 . . . A

Al quantity/Fe quantity>1.6 . . . B b/a≧0.05 . . . C

In a preferred embodiment of the present invention, the dispersion layer has a depth extending by 2 to 50 μm from a surface thereof.

In a preferred embodiment of the present invention, the dispersion layer is so constructed that the intermetallic compound particles of 0.1 μm or more in particle diameter corresponding to a circle have an average particle diameter within a range of from 0.2 to 2.0 μm.

In a preferred embodiment of the present invention, the dispersion layer has the intermetallic compound dispersed at density of 3000 to 30000 in number per $mm^2$ in a plane direction.

In a preferred embodiment of the present invention, Cu is contained in an amount of 10 ppm to 40 ppm in a mass ratio.

In a preferred embodiment of the present invention, the aluminum alloy plate further contains, in a mass ratio, 0.004 to 0.1% of Zr and 0.004 to 0.1% of at least one selected from the group consisting of Sn, In and Zn in total.

In a preferred embodiment of the present invention, Zr and at least one of Sn, In and Zn are present, in total, in an amount of 0.12% or less in a mass ratio.

In a preferred embodiment of the present invention, the aluminum alloy plate further contains, in a mass ratio, 0.01 to 0.3% of at least one of Mg and Mn in total.

DETAILED DESCRIPTION OF THE INVENTION

First, a content of each of ingredients of an aluminum alloy plate for a planographic printing plate according to the present invention will be discussed.

Fe: 0.1 to 0.6%

Fe is indispensable for formation of an AlFe-based precipitation or crystallization compound(intermetallic compound) and Fe of 0.1% or more in an amount is required to provide a suitable amount of intermetallic compound particles. Fe below 0.1% in an amount causes insufficient formation of the intermetallic compound, to thereby fail to provide the aluminum alloy plate with desired or satisfactory etching properties. Whereas, a content of Fe above 0.6% leads to formation of a huge precipitation or crystallization compound, which renders formation of pits by electrolytic etching non-uniform. Thus, a content of Fe in the aluminum alloy plate is set to be within a range of between 0.1% and 0.6%. Preferably, it is within a range of between 0.2% (lower limit) and 0.4% (upper limit) for the same reason.

Si: 0.01 to 0.2%

Si is one of elements for forming an AlFeSi-based precipitation or crystallization compound. A content of Si above 0.2% in the aluminum alloy plate leads to excessive formation of the compound, so that Fe is consumed to interfere with formation of the AlFe-based metastable phase. Also, it causes formation of a Si-based precipitation or crystallization compound of a huge size, to thereby render formation of pits by electrolytic etching non-uniform. Thus, an upper limit of the Si content is set to be 0.2%. Whereas, a reduction in content of Si to a level below 0.01% causes consumption of a bullion at a high purity, leading to an increase in manufacturing cost of the aluminum alloy plate. Thus, the content of Si is set to be within a range of between 0.01% and 0.2%. For the same reason, it is preferably within a range of between 0.04% (lower limit) and 0.08% (upper limit).

Cu: 5 to 150 ppm

Presence of Cu in a suitable amount in the aluminum alloy plate facilitates formation of pits and renders formation of pits uniform. Also, Cu cooperates with the above-described metastable phase intermetallic compound particles to substantially improve etching properties of the aluminum alloy plate. However, a content of Cu below 5 ppm in the aluminum alloy plate causes pits formed during a surface roughing treatment of the aluminum alloy plate to be reduced in depth or formation of the pits to be hard. Thus, the content is set to be 5 ppm or more. A content of Cu above 150 ppm leads to local electrolytic etching although it increases a depth of the pits. This results in pits of a large size being non-uniformly formed on the aluminum alloy plate and causes the metastable phase positively formed in the present invention to be changed to a stable phase. Thus, a content of Cu is set to be within a range of between 5 ppm and 150 ppm. For the same reason, it is preferably set between 10 ppm (lower limit) and 100 ppm (upper limit). More preferably, the upper limit is 40 ppm.

Zr and at Least one of Sn, In and Zn

Zr: 0.004 to 0.1%

At least one of Sn, In and Zn: 0.004 to 0.1% (in total)

Zr is precipitated in the form of $Al_3Zr$ in the course of casting and rolling of the alloy. Taking of the precipitate in an alumite film during manufacturing of a PS printing plate enhances wear resistance of the alumite film. Such an increase in wear resistance restrains wearing of the alumite due to printing, to thereby contribute to an improvement in resistance to printing of the aluminum alloy plate. Also, Sn, In and Zn further promote such an action of the aluminum alloy plate. The reason would be that Sn, In and Zn is taken in the alumite film, leading to an increase in wear resistance. In addition, such elements each function to deteriorate insulation of an oxide film formed on a surface of aluminum. The oxide film is immediately formed on a surface of an aluminum material when it is subjected to a degreasing treatment for formation of alumite, however, the oxide film thus formed has a thickness rendered non-uniform due to a structure of the material, orientation of crystal grains thereof and unevenness of a surface thereof. When the surface is subjected to alumite formation, application of a current to the surface is non-uniform due to non-uniform insulation of the oxide film, leading to formation of an alumite film substantially varied in thickness. A portion of the alumite film reduced in thickness is deteriorated in wear resistance. Thus, addition of only Zr fails to permit it to satisfactorily exhibit its function and effect. On the contrary, addition of at least one of Sn, In and Zn deteriorates insulation of the oxide film, to thereby contribute to formation of a uniform alumite film, resulting in wear resistance of the alumite film being substantially increased.

Thus, in order to permit the aluminum alloy plate to effectively exhibit enhanced wear resistance, it is required that the alloy plate contains at least one of Sn, In and Zn as well as Zr. In order to positively obtain such an advantage, these elements are preferably added to the alloy as well.

A content of Zr below 0.004% and that of at least one of Sn, In and Zn below 0.004%(in total) fail to permit the aluminum alloy plate to exhibit desired wear resistance, whereas a content of Zr above 0.1% and that of at least one of Sn, In and Zn above 0.1% (in total) reduce an increase in hardness of the alumite film. Also, it causes Zr and at least one of Sn, In and Zn to promote a phase change of $Al_5Fe$ to $Al_3Fe$ and deteriorates uniformity of electrolytic etching. Thus, contents of Zr and at least one of Sn, In and Zn are set to be within the above-described ranges. For the same reason, it is preferable that a content of Zr and at least one of Sn, In and Zn is 0.12% or less in total.

Suitably, a content of Zr in the aluminum alloy plate has a lower limit of 0.01% and an upper limit of 0.05% and a content of at least one of Sn, In and Zn therein has a lower limit of 0.004% and an upper limit of 0.02%.

At Least one of Mg and Mn: 0.01 to 0.3% (in Total)

Mg and Mn function to increase strength of the aluminum alloy plate. At least one of Mg and Mn may be contained therein as desired. The content below 0.01% in total fails to increase the strength, whereas the content above 0.3% leads to a deterioration in uniform electrolytic etching and wear resistance of the alumite. Thus, the content is set to be within a range of between 0.01% and 0.3% in total.

Avoidable Impurities

The aluminum alloy plate of the present invention may contain avoidable impurities as well as the above-described ingredients. The available impurities include Cr, Ga, Pb, V, Ni and the like. In order to prevent the avoidable impurities from adversely affecting functions of the alloy plate of the present invention, it is preferable that a content of the avoidable impurities is 0.03% or less in total.

Metastable Phase Dispersion Layer

The conventional aluminum alloy plate for a planographic printing plate has an AlFe-based intermetallic compound of a stable phase dispersed therein while being free of a metastable phase dispersion layer. On the contrary, the aluminum alloy plate of the present invention includes a dispersion layer of which a surface layer portion has a metastable phase AlFe-based intermetallic compound dispersed therein. The metastable phase is indicated in the form of $Al_4Fe$, $Al_5Fe$, $Al_6Fe$ or $Al_mFe$ ($4<m<6$). These are present therein either solely or as a mixture. Also, the metastable phase particles are normally constituted by the metastable phase intermetallic compound. Alternatively, the particles may be present while keeping stable phase crystals and metastable phase crystals contiguous to each other.

The metastable phase intermetallic compound particles described above each readily act as a starting point for the pits as compared with stable phase intermetallic compound particles. This results in enhancing dispersion of the pits, to thereby effectively prevent occurrence of any unetching. In particular, $Al_mFe$ exhibits satisfactory functions when m is near 6.

Depth of Dispersion Layer

The dispersion layer described above is desirably formed into a depth of 2 to 50 $\mu$m from a surface thereof. In manufacturing of the aluminum alloy plate for the planographic printing plate, the surface layer is removed by degreasing using any suitable means such as caustic washing, acid etching, mechanical polishing or the like after rolling of the alloy and before electrolytic etching thereof. More specifically, the chemical pretreatment generally permits the surface layer to be removed by a depth of 2 to 5 $\mu$m and the mechanical polishing generally leads to removal thereof by a depth of 5 to 10 $\mu$m. Thus, a depth of the dispersion layer is desirably 2 $\mu$m or more. Thus, a depth of the dispersion layer referred to herein indicates that obtained before removal of the surface layer and after rolling. Also, a depth of the dispersion layer above 50 $\mu$m does not substantially participate in an improvement in electrolytic etching. Thus, the depth as large as 50 $\mu$m is sufficient.

Ratio Between Metastable Phase and Stable Phase (in Dispersion Layer)

The dispersion layer has the metastable phase intermetallic compound particles which satisfactorily function as stating points for pits dispersed at a ratio.

In this instance, it is preferable that the metastable phase AlFe-based intermetallic compound particles are dispersed at a ratio of 5 to 100 of the stable phase AlFe-based intermetallic compound particles. The ratio below 5 fails to permit the aluminum alloy plate to exhibit an intended effect. More preferably, for the same reason, the metastable phase AlFe-based intermetallic compound particles are dispersed at a ratio of 15 or more.

Whether the intermetallic compound has a metastable phase or a stable phase is judged on the basis of a ratio between an Fe content in the particles and an Al content therein. There is a case that the stable phase and metastable phase are mixed present in the particles. In this case, the mixture phase intermetallic compound particles each likewise act as a starting point for the pits, so that they may be regarded as an equivalent of the metastable phase intermetallic compound particles.

The above-described ratio may be indicated by Al quantity/Fe quantity in each of the particles. The particles having the ratio of 1.6 or less (Al quantity/Fe quantity$\leqq$1.6 . . . expression A) may be regarded as stable phase particles and those having the ratio above 1.6 (Al quantity/Fe quantity>1.6 . . . expression B) may be regarded as metastable phase particles.

Thus, supposing that the number of particles satisfying the expression A is a and that satisfying the expression B is b, a ratio (b/a) therebetween of 0.05 or more leads to an improvement due to dispersion of the metastable phase particles. More preferably, the ratio is 0.15 or more.

It is not required to set an upper limit of a ratio of the metastable phase particles to the stable phase particles. However, supposing that the stable phase particles are relatively set to be 1 due to restrictions on manufacturing or the like, the upper limit is about 9.

Intermetallic Compound Particles

The intermetallic compound particles each act as a starting point for etching pits. Thus, a size of the particles affects properties of the pits subsequently growing. A reduction in diameter of the particles to a degree of rendering the particles excessively fine fails to permit the particles to act as the etching pits, whereas an excessive increase in particle diameter causes a deterioration in uniformity of the pits. An effect of the particle diameter may be considered in view of an average particle diameter of the intermetallic compound in the whole dispersion layer. However, the intermetallic compound particles below 0.1 $\mu$m in a diameter may be substantially ignored from a viewpoint of the starting point for the pits, therefore, only particles of 0.1 $\mu$m or more in a diameter corresponding to a circle are considered. A lower limit of the average circle-corresponding diameter is preferably 0.2 $\mu$m or more in order to ensure that they function as the starting point for the pits. Also, the average circle-corresponding diameter is preferably 2.0 $\mu$m or less in order to ensure satisfactory uniformity of the pits. More preferably, for the same reason, a lower limit of the average circle-corresponding diameter is 0.5 $\mu$m and an upper limit thereof is 1.5 $\mu$m.

In this instance, the intermetallic compound particles may have a stable phase or a metastable phase.

Also, density of dispersion of the intermetallic compound particles is essential in order to permit the particles to form a sufficient number of pits. The density is considered in a plane direction, rephrased that in a direction of section of the dispersion layer at a desired depth thereof which is parallel to a surface thereof. The density below 3000 in number of particles/mm$^2$ renders the number of particles insufficient to permit the particles to act as starting points for pits, leading to a failure to provide a sufficient number of pits. Whereas, the density above 30000 in number of particles/mm$^2$ fails to further enhance the above-described advantage and deteriorates uniformity of the pits. Thus, the density of dispersion of the intermetallic compound particles is preferably between 3000 in number of particles/mm$^2$ and 30000 in number of particles/mm$^2$. Also, for the same reason, it is preferable that a lower limit of the density is 8000 in number of particles/mm$^2$ and an upper limit thereof is 20000 in number of particles/mm$^2$. In this instance, the intermetallic compound particles may have a stable phase or a metastable phase. Also, the above-described density of dispersion of the intermetallic compound particles is preferably applied to particles of 0.1 $\mu$m or more in circular-corresponding diameter.

As will be noted from the foregoing, the aluminum alloy plate of the present invention contains a suitable amount of Cu contributing to uniform formation of pits and has the AlFe-based intermetallic compound dispersed in the surface layer portion. This permits electrolytic etching to be carried out so as to provide a roughed surface which is reduced in unetching and has pits uniformly formed thereon. This permits a photosensitive agent to be intimately deposited on the plate during formation of a photosensitive layer, to thereby provide a printing plate capable of exhibiting improved performance.

The aluminum alloy plate of the present invention may be manufactured according to a combination of any conventional method and any method known in the art. However, in the manufacturing, it is required to ensure that the dispersion layer in which the metastable phase particles are dispersed is formed. In the conventional manufacturing method, a homogenizing treatment is carried out in order to prevent segregation of the ingredients or the like after formation of the alloy by melting. Unfortunately, the homogenizing treatment fails to permit the metastable phase to be present in the alloy. Also, sufficient heating of the alloy during a soaking treatment before hot rolling of the alloy causes metastable phase present in a slight amount in the alloy to be lost. On the contrary, the present invention permits heat control to be properly carried out during manufacturing of the alloy, to thereby provide an aluminum alloy plate in which the metastable phase particles are kept adequately dispersed.

Now, manufacturing of the aluminum alloy plate of the present invention will be described.

Aluminum alloy for the aluminum alloy plate of the present invention may be made by melting according to any suitable conventional techniques. For example, the components or ingredients for the aluminum alloy plate each are subjected to proportioning so as to fall within the above-described ranges and then subjected to casting, resulting in the alloy being prepared. Then, according to any suitable conventional method, a homogenizing treatment is carried out at a temperature of 550° C. or above to homogenize the alloy thus cast. However, in the present invention, the homogenizing treatment may be eliminated or carried out at a temperature of 500° C. or below, to thereby ensure that the metastable phase is dispersed in the dispersion layer.

The aluminum alloy thus obtained which contains the above-described ingredients is subjected to hot rolling and cold rolling, resulting in a sheet of the aluminum alloy being provided. During the manufacturing, annealing may be suitably carried out as desired.

The aluminum alloy sheet thus obtained is used as the aluminum alloy plate.

The aluminum alloy plate, as described above, is normally subjected to surface cleaning prior to application of a photosensitive agent thereto. For the surface cleaning, washing takes place for removing oil, foul and the like adhered to a surface of the plate therefrom. The washing is normally carried out by a caustic treatment using caustic soda. Alternatively, in the present invention, the washing may be carried out by an acid treatment or the like as well as the caustic treatment. Also, the washing may be carried out without using the caustic treatment so long as it accomplishes the intended purpose. Further, the present invention is not limited to any specific washing liquid, washing procedure, washing conditions and the like. Thus, the washing may be attained according to any suitable conventional techniques. Alternatively, the surface cleaning may be carried out by mechanical polishing combined with the above-described washing or substituted for the washing.

The aluminum alloy plate of which the surface has been cleaned as described above is then subjected to a surface roughing treatment. The surface roughing treatment may be practiced by electrolytic etching. Such surface roughing is for the purpose of permitting a photosensitive agent described below to be firmly fixed onto a surface of the planographic printing plate. The present invention is not limited to any specific conditions for the electrolytic etching. Thus, in the present invention, the surface roughing treatment may be carried out according to any suitable conventional techniques.

The material of the present invention may exhibit enhanced electrolytic etching properties, so that the electrolytic etching for the surface roughing treatment permits the alloy plate to be formed with a roughed surface on which pits are uniformly formed and which is substantially reduced in unetching.

Moreover, normally the planographic printing plate is then subjected to a treatment for forming an anodic oxide film thereon to ensure intended corrosion protection and wear resistance. Such formation of the anodic oxide film may be carried out according to any suitable conventional techniques. The present invention is not limited to any specific conditions for the treatment and properties of the film. After formation of the anodic oxide film, a desired photosensitive agent is applied to a surface of the plate. The present invention is not limited to any specific photosensitive agent, thus, any suitable photosensitive agent known in the art may be applied to the present invention. Also, an apparatus for application of the photosensitive agent, a method for applying the agent and an amount in which it is applied to the plate may be selected as desired. The alloy plate to which the photosensitive agent has been applied is provided as a PS printing plate.

As can be seen from the foregoing, the aluminum alloy plate for planography according to the present invention contains, in a mass ratio, 0.1 to 0.6% of Fe, 0.01 to 0.2% of Si, 5 to 150 ppm of Cu, and balance of Al and unavoidable impurities. Also, the aluminum alloy plate has the surface layer portion formed of the dispersion layer having the metastable phase in which the metastable phase AlFe-based intermetallic compound particles are dispersed. Such construction permits the aluminum alloy plate to be provided with a roughed surface reduced in unetching and having pits uniformly distributed thereon by electrolytic etching, so that the alloy plate may exhibit increased performance for the planographic printing plate.

The invention will be understood more readily with reference to the following example; however, the example is intended to illustrate the invention and is not to be construed to limit the scope of the invention.

EXAMPLE 1

Aluminum alloy having a composition shown in Table 1 was cast by melting to prepare a slab. The slab was then subjected to facing. Then, the slab was subjected to hot rolling and cold rolling, to thereby provide an aluminum alloy plate of 0.3 mm in thickness (samples). The samples each had tensile strength as shown in Table 2.

Then, the aluminum alloy plate was subjected to a pre-treatment or a treatment of removing a surface layer from the plate. For this purpose, wet buffing was carried out using alumina particles of 0.3 μm in particle diameter, resulting in the surface layer being removed by a predetermined thickness or depth from the plate. (A part of the samples was not subjected to removal of the surface layer.)

After removal of the surface layer, observation of intermetallic compound particles on a surface of the alloy plate in a plane direction thereof was carried out using an EPMA (Electoron Probe X-ray Microanalyzer). The observation was carried out on an area of 0.01 $mm^2$. This resulted in density of dispersion of particles (having a diameter of 0.1 μm or more), an average circle-corresponding particle diameter of particles (having a diameter of 0.1 μm or more) and the amount of Al or Fe being measured. Also, a ratio (Al quantity/Fe quantity) for each of the particles was measured, so that a ratio b/a was obtained wherein a is the number of particles having the ratio of 1.6 or more and b is the number of particles having the ratio below 1.6. The results were as shown in Table 2.

Evaluation of Electrolytic Etching

The above-described aluminum alloy plate was subjected to an electrolytic etching treatment for 40 seconds at a temperature of 25° C., a frequency of 50 Hz and current density of 60 $A/dm^2$ using a solution of 2% HCL, resulting in being evaluated as described below.

(Evaluation of Unetching)

A surface of the aluminum alloy plate was observed using an SEM (scanning electron microscope 500× magnification). As a result, the plate of which an unetched portion has an area ratio above 30% was indicated at ×, that having an area ratio between 20% and 30% was indicated at Δ and that having an area ratio below 20% was indicated at ○.

(Evaluation of Uniformity of Pits)

The aluminum alloy plate wherein pits of a large size above 15 μm in circle-corresponding diameter were formed at an area ratio above 10% on the basis of all pits on the surface thereof which was subjected to electrolytic etching was indicated at ×, that below 10% and of 5% or more was indicated at ○ and that below 5% was indicated at ⊚.

Wear Resistance Test

The aluminum alloy plate subjected to electrolytic treatment was washed with water. Then, it was dipped in a 15% sulfuric acid solution at 20° C., wherein a DC current at density of 1 $A/dm^2$ was fed to the aluminum alloy plate for 45 minutes while keeping the plate connected to a positive electrode, to thereby form an alumite film on the plate. Then, a wear resistance test was carried out on the plate.

The wear resistance test was executed according to a procedure defined in JIS H8682. More specifically, the aluminum alloy plate was set while being kept inclined at 45 degrees. Then silicon carbide sands were dropped at a rate of 320 g/min on the plate. Under such conditions, the drop test was carried out for 1000 seconds. Judgment was made by observing an area ratio of a worn site on the plate. Wearing below 10% was indicated at ⊚, that 10% and more and below 30% was indicated at ○ and that of 30% or more was indicated at ×.

Evaluation of each of the tests was as shown in Table 2.

TABLE 1

| | Chemical Composition (mass %) | | | | | | | | | |
|---|---|---|---|---|---|---|---|---|---|---|
| Sample No. | Fe | Si | Cu* | Zr | In, Sn, Zn | Mg | Mn | Al + Avoidable Impurities | Mg + Mn | Zr + (In, Sn, Zn) % |
| Examples | | | | | | | | | | |
| 1 | 0.31 | 0.06 | 20 | — | — | — | — | Balance | — | — |
| 2 | 0.33 | 0.06 | 50 | — | — | — | — | Balance | — | — |
| 3 | 0.31 | 0.06 | 120 | — | — | — | — | Balance | — | — |
| 4 | 0.58 | 0.06 | 20 | — | — | — | — | Balance | — | — |
| 5 | 0.31 | 0.17 | 30 | — | — | — | — | Balance | — | — |
| 6 | 0.30 | 0.07 | 30 | 0.005 | 0.020 In | — | — | Balance | — | 0.025 |
| 7 | 0.31 | 0.07 | 60 | 0.06 | 0.05 Sn | — | — | Balance | — | 0.11 |
| 8 | 0.30 | 0.06 | 70 | 0.02 | 0.05 Zn | — | — | Balance | — | 0.07 |
| 9 | 0.31 | 0.07 | 10 | 0.02 | 0.01 In | 0.02 | 0.02 | Balance | 0.04 | 0.03 |
| 10 | 0.30 | 0.06 | 10 | 0.01 | 0.02 Zn | 0.20 | 0.10 | Balance | 0.30 | 0.03 |
| Comparative Examples | | | | | | | | | | |
| 1 | 0.31 | 0.06 | 210 | — | — | — | — | Balance | — | — |
| 2 | 0.33 | 0.06 | 4 | — | — | — | — | Balance | — | — |
| 3 | 0.33 | 0.06 | 220 | — | — | — | — | Balance | — | — |
| 4 | 0.91 | 0.06 | 60 | — | — | — | — | Balance | — | — |
| 5 | 0.30 | 0.33 | 50 | — | — | — | — | Balance | — | — |
| 6 | 0.08 | 0.06 | 50 | — | — | — | — | Balance | — | — |
| 7 | 0.31 | 0.06 | 40 | — | — | — | — | Balance | — | — |
| 8 | 0.31 | 0.06 | 50 | 0.07 | 0.06 In | — | — | Balance | — | 0.13 |
| 9 | 0.31 | 0.06 | 80 | 0.01 | 0.01 Sn | 0.10 | 0.30 | Balance | 0.40 | 0.02 |

Cu*: ppm,
"—": No addition, below 0.004%

TABLE 2

| Sample No. | Observation Position (μm) | Average Particle Diameter (μm) | Number of Particles (number/mm²) | b/a | Evaluation of Etching | | Wear Resistance | Strength ($N/mm^2$) |
|---|---|---|---|---|---|---|---|---|
| | | | | | Unetching | Uniformity | | |
| Examples | | | | | | | | |
| 1 | Surface | 1.30 | 8500 | 0.35 | ○ | ◎ | ○ | <170 |
| 2 | 6 | 0.90 | 12000 | 0.28 | ○ | ○ | ○ | <170 |
| 3 | 10 | 1.25 | 11000 | 0.21 | ○ | ○ | ○ | <170 |
| 4 | 15 | 1.52 | 21000 | 0.40 | ○ | ◎ | ○ | <170 |
| 5 | 5 | 1.70 | 13700 | 0.11 | Δ | ◎ | ○ | <170 |
| 6 | 5 | 1.35 | 8800 | 0.20 | ○ | ◎ | ◎ | <170 |
| 7 | 5 | 1.31 | 9100 | 0.22 | ○ | ○ | ◎ | <170 |
| 8 | 7 | 1.30 | 7900 | 0.25 | ○ | ○ | ◎ | <170 |
| 9 | 3 | 1.28 | 6900 | 0.22 | ○ | ○ | ◎ | 172 |
| 10 | 5 | 1.10 | 25000 | 0.11 | ○ | ○ | ◎ | 188 |
| Comparative Examples | | | | | | | | |
| 1 | 12 | 1.38 | 12000 | 0.15 | Δ | X | ○ | <170 |
| 2 | 15 | 1.51 | 7300 | 0.03 | X | ○ | ○ | <170 |
| 3 | 12 | 1.75 | 9800 | 0.01 | X | X | ○ | <170 |
| 4 | 11 | 2.10 | 31000 | 0.22 | ○ | X | ○ | <170 |
| 5 | 6 | 1.61 | 18200 | 0.10 | Δ | X | ○ | <170 |
| 6 | 5 | 0.18 | 2600 | 0.05 | X | ○ | ○ | <170 |
| 7 | 10 | 1.80 | 3500 | <0.01 | X | X | ○ | <170 |
| 8 | 5 | 1.30 | 7800 | 0.05 | Δ | Δ | ◎ | <170 |
| 9 | 5 | 1.80 | 29000 | 0.08 | X | Δ | X | 205 |

As will be noted from Table 2, the aluminum alloy plate of the present invention which has a suitable composition and includes the surface layer having the metastable phase intermetallic compound particles dispersed therein is reduced in unetching and permits pits to be uniformly distributed thereon, to thereby be provided with a satisfactory roughed surface. Also, the present invention is increased in wear resistance. On the contrary, the comparative material which is not constructed as in the present invention is disadvantageous as compared with the present invention.

While a preferred embodiment of the invention has been described with a certain degree of particularity with reference to the drawings, obvious modifications and variations are possible in light of the above-teachings. It is therefore to be understood that within the scope of the appended claims, the invention may be practiced otherwise as specifically described.

What is claimed is:

1. An aluminum alloy plate for a planographic printing plate comprising, in a mass ratio, 0.2 to 0.6% of Fe, 0.01 to 0.2% of Si, 5 to 150 ppm of Cu, and balance of Al and having a surface layer portion which forms a dispersion layer in a metastable phase in which AlFe-based intermetallic compound particles are dispersed such that said dispersion layer contains, in a plane direction, the metastable phase AlFe-based intermetallic compound particles in a ratio of 5/100 or more to the number of stable phase AlFe-based intermetallic compound particles.

2. An aluminum alloy plate as defined in claim 1, wherein said dispersion layer is constructed in a plane direction so that of the intermetallic compound particles, particles (a in number) satisfying the following expression A and those (b in number) satisfying the following expression B have relationship therebetween which satisfies the following expression C:

Al quantity/Fe quantity≦1.6 . . . A

Al quantity/Fe quantity>1.6 . . . B b/a≧0.05 . . . C.

3. An aluminum alloy plate as defined in claim 1, wherein said dispersion layer is has a depth of 2 to 50 μm from a surface thereof.

4. An aluminum alloy plate as defined in claim 1, wherein said dispersion layer is so constructed that the intermetallic compound particles of 0.1 μm or more in circle-corresponding particle diameter have an average particle diameter within a range of from 0.2 to 2.0 μm.

5. An aluminum alloy plate as defined in claim 1, wherein said dispersion layer has the intermetallic compound particles dispersed by density in a range of between 3000 to 30000 in number/mm² in a plane direction.

6. An aluminum alloy plate as defined in claim 1, wherein Cu is contained in an amount of 10 to 40 ppm in a mass ratio.

7. An aluminum alloy plate as defined in claim 1, further comprising, in a mass ratio, 0.004 to 0.1% of Zr and 0.004 to 0.1% of at least one element selected from the group consisting of Sn, In, and Zn in total.

8. An aluminum alloy plate as defined in claim 7, wherein Zr and at least one of Sn, In and Zn are present, in total, in an amount of 0.12% or less in a mass ratio.

9. An aluminum alloy plate as defined in claim 1, further comprising, in a mass ratio, 0.01 to 0.3% of at least one of Mg and Mn in total.

10. An aluminum alloy plate as defined in claim 1, wherein said dispersion layer is constructed in a plane direction so that of the intermetallic compound particles, particles (a in number) satisfying the following expression A and those (b in number) satisfying the following expression B have relationship therebetween which satisfies the following expression C:

Al quantity/Fe quantity≦1.6 . . . A

Al quantity/Fe quantity>1.6 . . . B b/a≧0.05 . . . C.

11. An aluminum alloy plate as defined in claim 2, wherein said dispersion layer is so constructed that the intermetallic compound particles of 0.1 μm or more in circle-corresponding particle diameter have an average particle diameter within a range of from 0.2 to 2.0 μm.

12. An aluminum alloy plate as defined in claim 3, wherein said dispersion layer is so constructed that the intermetallic compound particles of 0.1 μm or more in circle-corresponding particle diameter have an average particle diameter within a range of from 0.2 to 2.0 μm.

13. An aluminum alloy plate as defined in claim 1, wherein said dispersion layer has the intermetallic compound particles dispersed by density in a range of between 3000 to 30000 in number/$mm^2$ in a plane direction.

14. An aluminum alloy plate as defined in claim 2, wherein said dispersion layer has the intermetallic compound particles dispersed by density in a range of between 3000 to 30000 in number/$mm^2$ in a plane direction.

15. An aluminum alloy plate as defined in claim 4, wherein said dispersion layer has the intermetallic compound particles dispersed by density in a range of between 3000 to 30000 in number/$mm^2$ in a plane direction.

16. An aluminum alloy plate as defined in claim 1, wherein Cu is contained in an amount of 10 to 40 ppm in a mass ratio.

17. An aluminum alloy plate as defined in claim 2, wherein Cu is contained in an amount of 10 to 4 ppm in a mass ratio.

18. An aluminum alloy plate as defined in claim 3, wherein Cu is contained in an amount of 10 to 40 ppm in a mass ratio.

19. An aluminum alloy plate as defined in claim 4, wherein Cu is contained in an amount of 10 to 40 ppm in a mass ratio.

20. An aluminum alloy plate as defined in claim 1, further comprising, in a mass ratio, 0.004 to 0.1% of Zr and 0.004 to 0.1% of at least one element selected from the group consisting of Sn, In, and Zn in total.

21. An aluminum alloy plate as defined in claim 2, further comprising, in a mass ratio, 0.004 to 0.1% of Zr and 0.004 to 0.1% of at least one element selected from the group consisting of Sn, In, and Zn in total.

22. An aluminum alloy plate as defined claim 3, wherein further comprising, in a mass ratio, 0.004 to 0.1% of Zr and 0.004 to 0.1% of at least one element selected from the group consisting of Sn, In, and Zn in total.

23. An aluminum alloy plate as defined in claim 4, further comprising, in a mass ratio, 0.004 to 0.1% of Zr and 0.004 to 0.1% of at least one element selected from the group consisting of Sn, In, and Zn in total.

24. An aluminum alloy plate as defined in claim 1, further comprising, in a mass ratio, 0.01 to 0.3% of at least one of Mg and Mn in total.

25. An aluminum alloy plate as defined in claim 2, further comprising, in a mass ratio, 0.01 to 0.3% of at least one of Mg and Mn in total.

26. An aluminum alloy plate as defined in claim 3, further comprising, in a mass ratio, 0.01 to 0.3% of at least one of Mg and Mn in total.

27. An aluminum alloy plate as defined in claim 6, further comprising, in a mass ratio, 0.01 to 0.3% of at least one of Mg and Mn in total.

28. An aluminum alloy plate as defined in claim 7, further comprising, in a mass ratio, 0.01 to 0.3% of at least one of Mg and Mn in total.

29. An aluminum alloy plate as defined in claim 3, wherein said dispersion layer has the intermetallic compound particles dispersed by density in a range of between 3000 to 30000 in number/$mm^2$ in a plane direction.

30. An aluminum alloy plate as defined in claim 5, further comprising, in a mass ratio, 0.004 to 0.1% of Zr and 0.004 to 0.1% of at least one element selected from the group consisting of Sn, In, and Zn in total.

31. An aluminum alloy plate as defined in claim 6, further comprising, in a mass ratio, 0.004 to 0.1% of Zr and 0.004 to 0.1% of at least one element selected from the group consisting of Sn, In, and Zn in total.

32. An aluminum alloy plate as defined in claim 8, further comprising, in a mass ratio, 0.01 to 0.3% of at least one of Mg and Mn in total.

* * * * *